Nov. 7, 1933.        I. C. JENNINGS        1,934,504
MECHANISM FOR AUTOMATICALLY ADJUSTING THE OPERATION OF PRESSURE REGULATORS
Filed Sept. 24, 1930        7 Sheets-Sheet 1
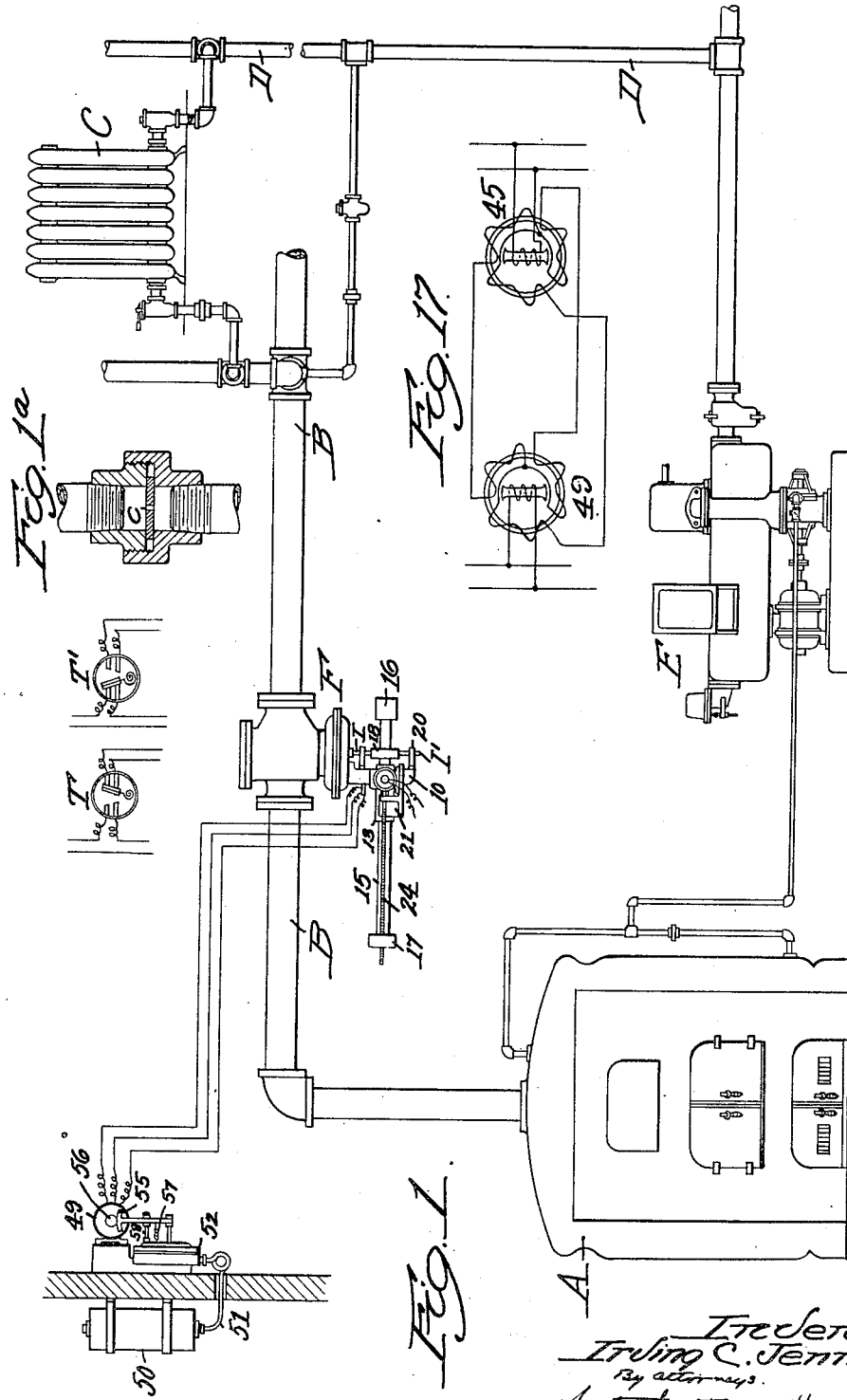
Inventor
Irving C. Jennings
By attorneys

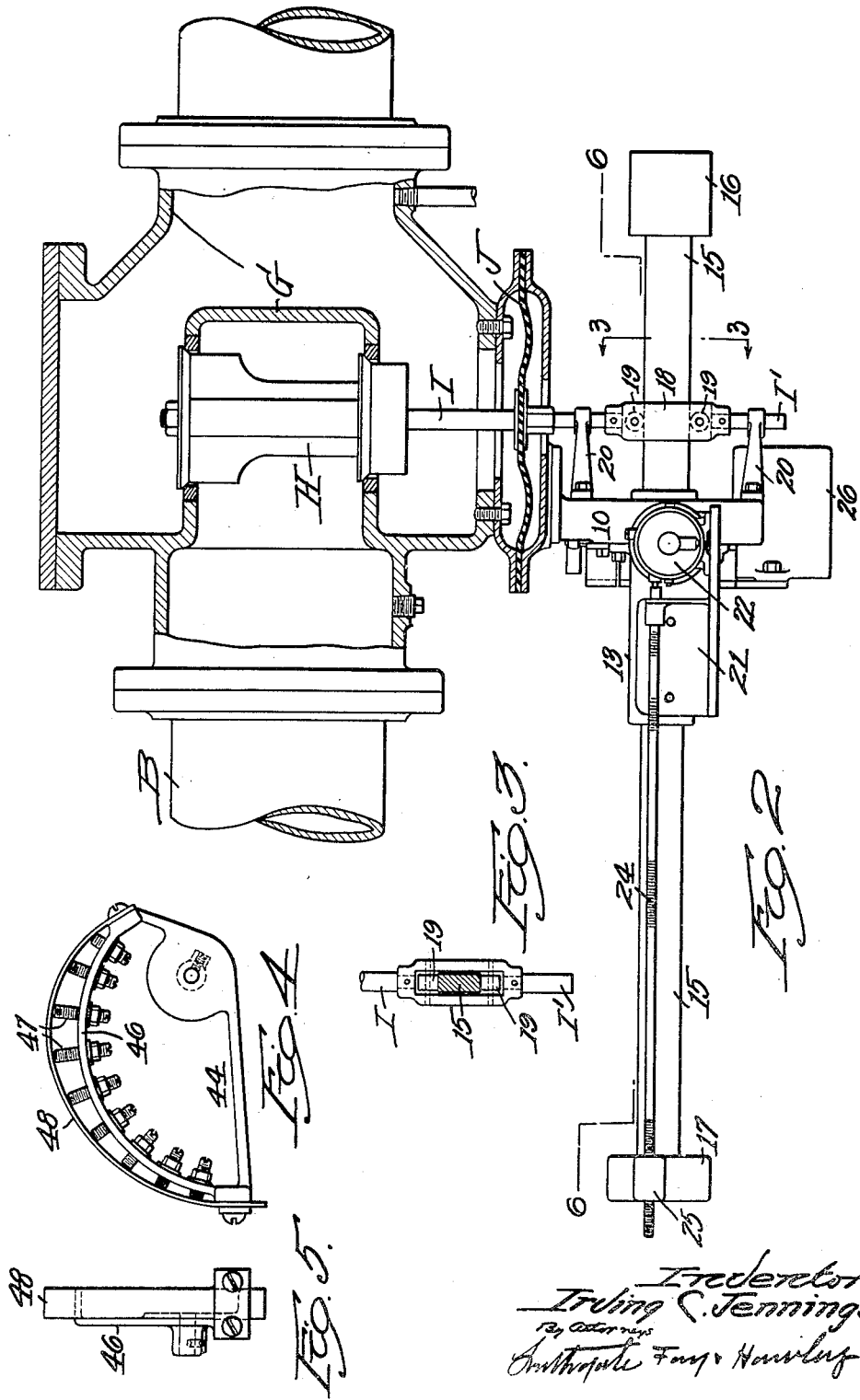

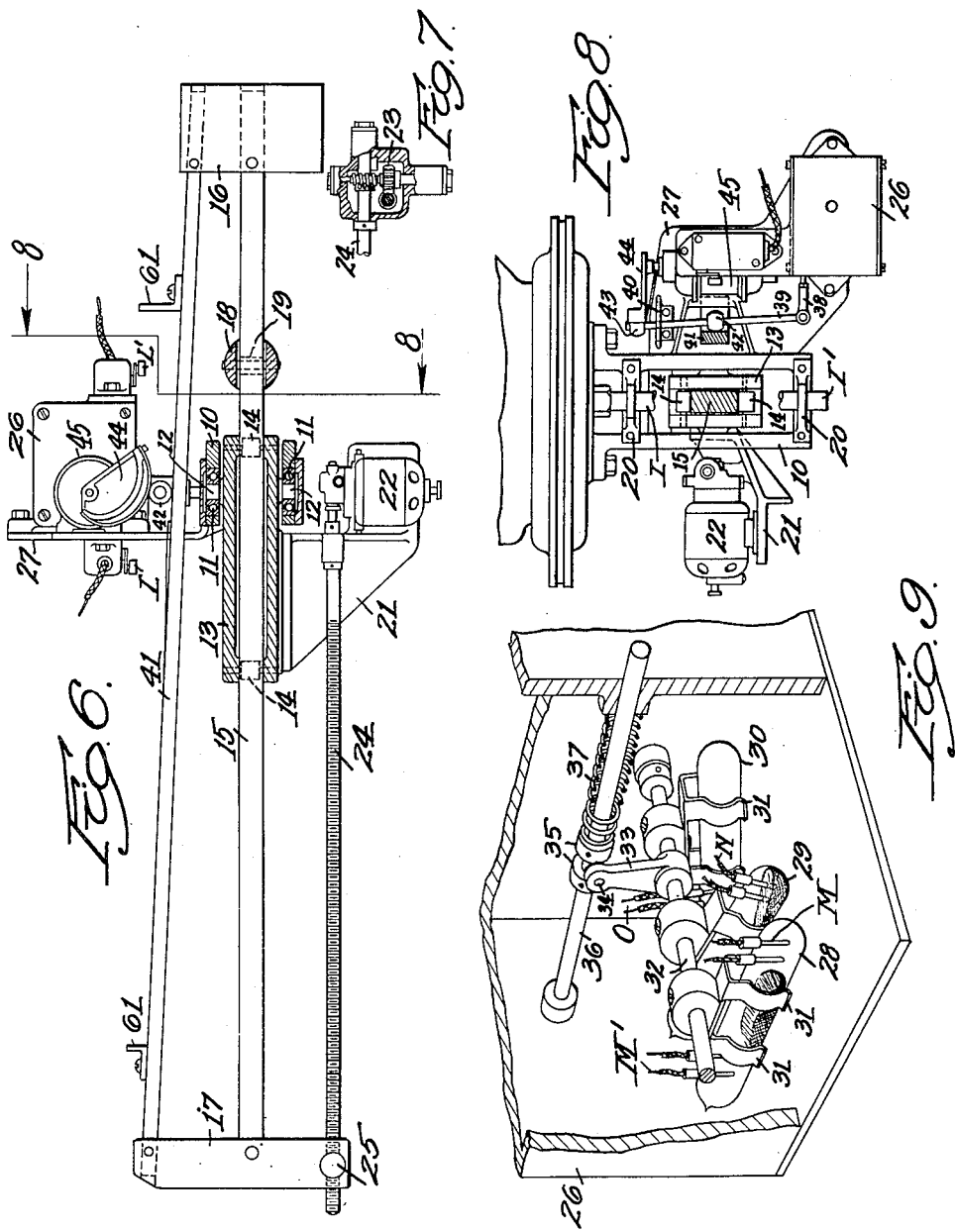

Nov. 7, 1933.  I. C. JENNINGS  1,934,504
MECHANISM FOR AUTOMATICALLY ADJUSTING THE OPERATION OF PRESSURE REGULATORS
Filed Sept. 24, 1930  7 Sheets-Sheet 4
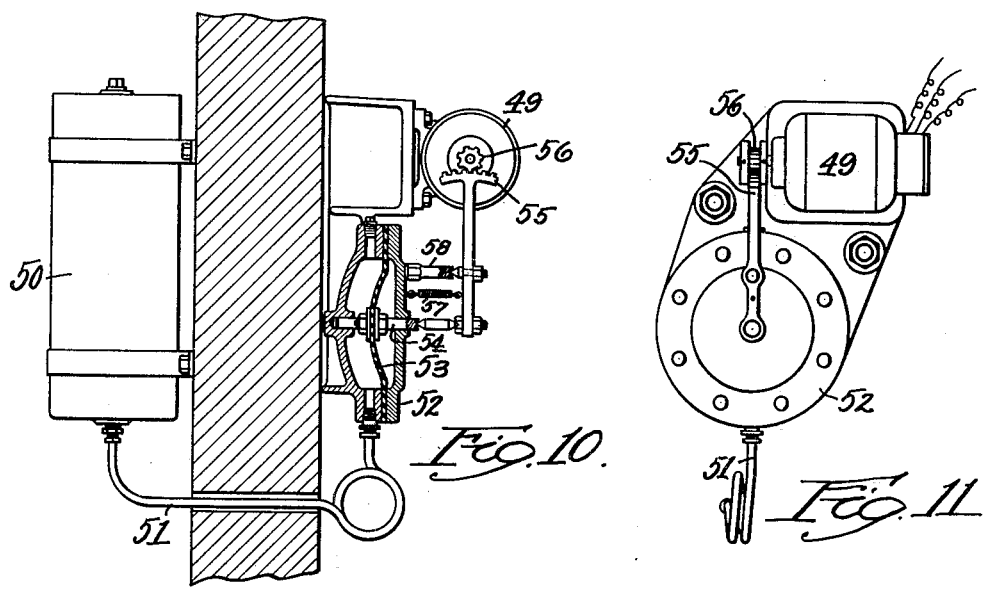
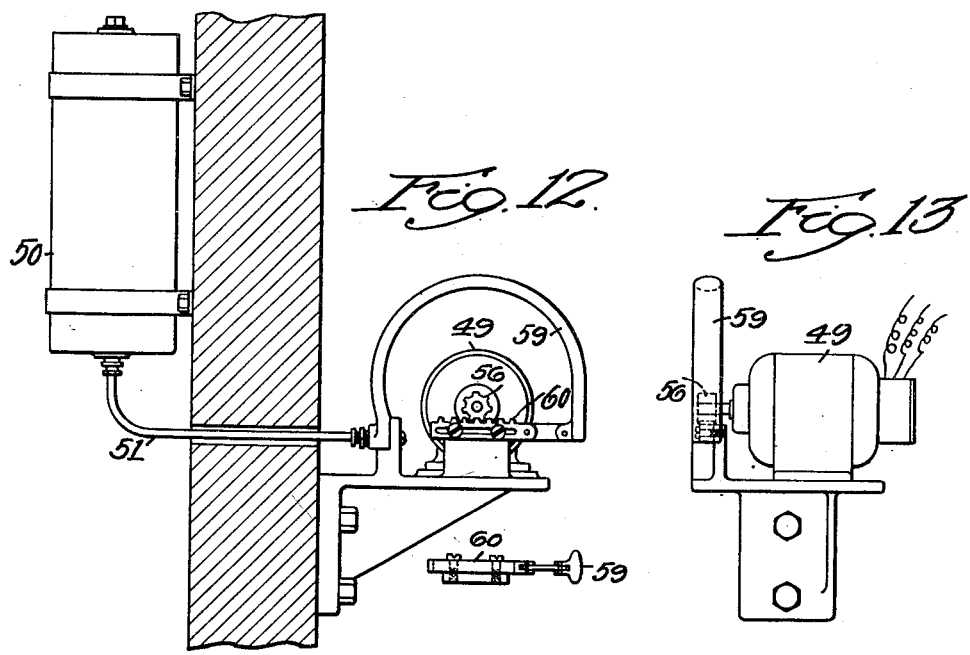

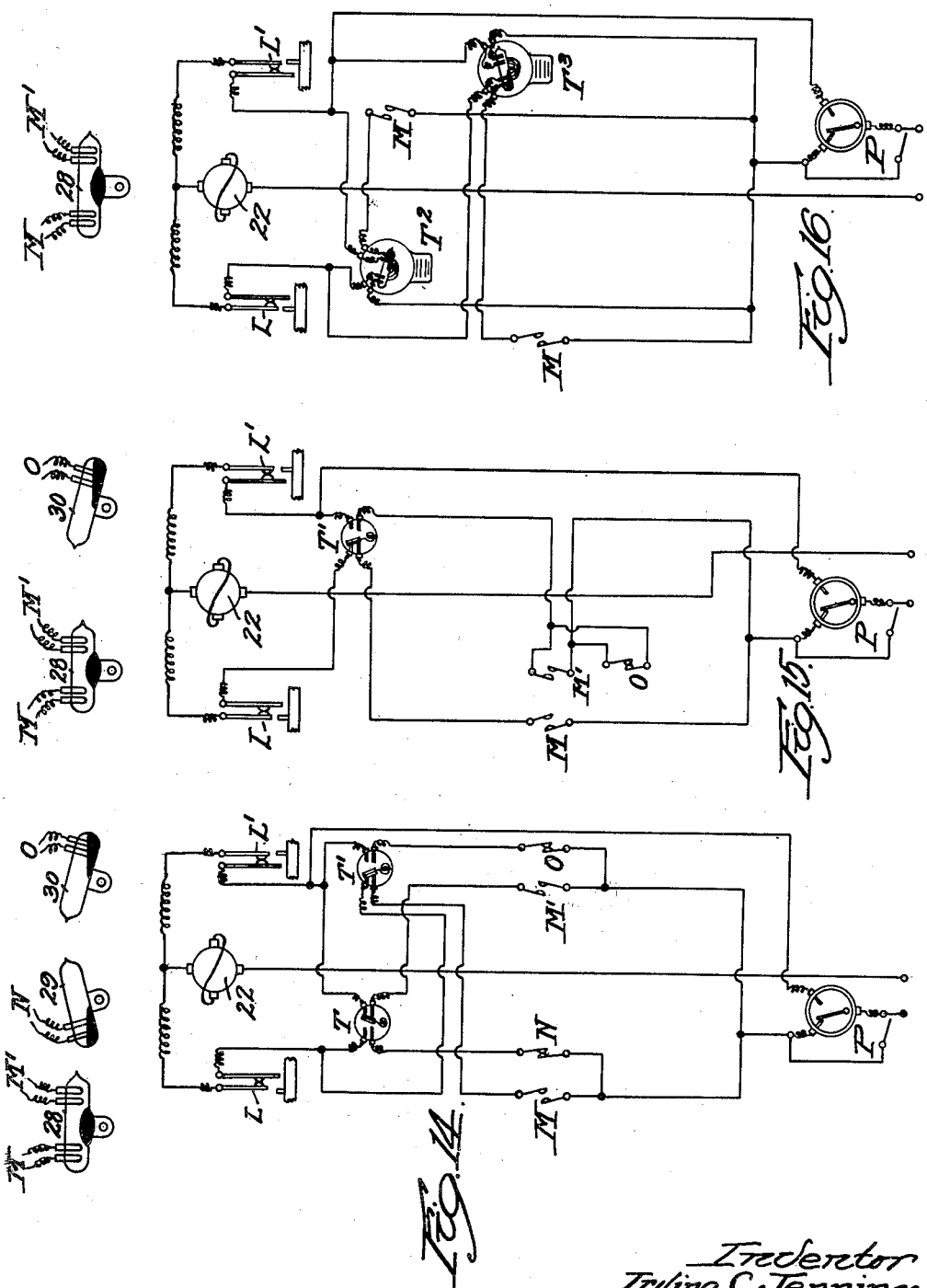

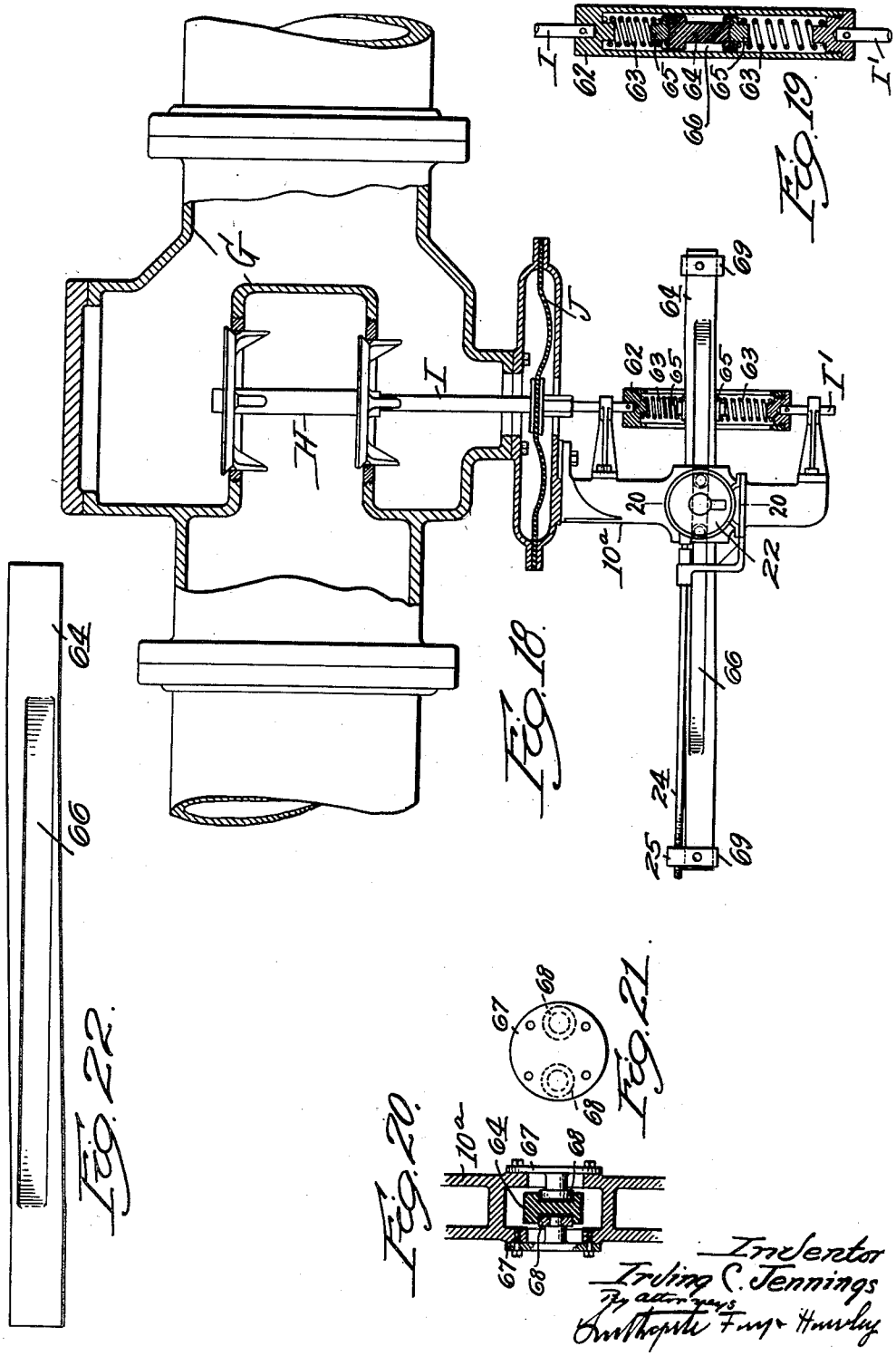

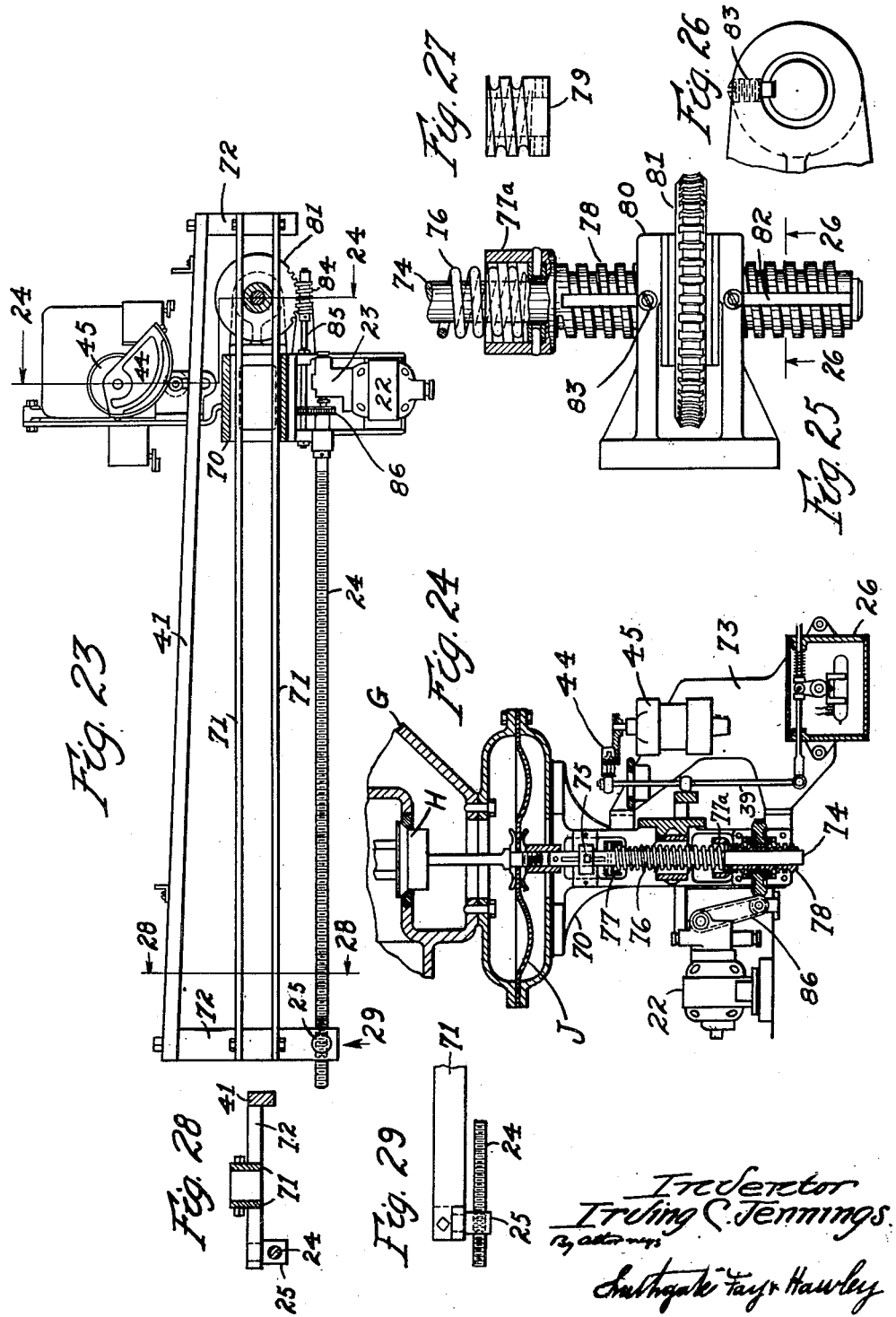

Patented Nov. 7, 1933

1,934,504

UNITED STATES PATENT OFFICE 1,934,504

MECHANISM FOR AUTOMATICALLY ADJUSTING THE OPERATION OF PRESSURE REGULATORS

Irving C. Jennings, South Norwalk, Conn.

Application September 24, 1930
Serial No. 484,219

33 Claims. (Cl. 236—91)

The object of this invention is to provide mechanism for automatically adjusting the operation of an automatically operating pressure regulator to meet varying temperature conditions.

The invention has been especially designed for use in connection with the automatically operating steam pressure regulator or reducing valve employed in steam heating systems, particularly vacuum steam heating systems.

In such a system, a pressure regulator or reducing valve is employed to automatically throttle the supply of steam passing to the supply line of the system, so that the pressure in the supply line will be set at a determined point to supply the radiators with just the proper amount of steam needed to maintain the space to be heated at a desired temperature.

A common way of adjusting the operation of this automatically operating pressure regulator has been to provide the same with a mechanical element, such as a weight or weights, or a spring or springs, which can be adjusted or shifted by hand to vary the operation to meet varying temperature conditions.

This is not a satisfactory solution of the problem of making proper and accurate adjustments, when and as needed, because the engineer cannot always be on the job of watching and making the necessary adjustments and because he cannot easily determine the amount of adjustment necessary.

The invention here involved comprehends providing such an automatically operating pressure regulator with mechanism which will automatically adjust the mechanical element, when and as needed, from varying temperature conditions, without any attention on the part of the engineer, and which adjustments are determined and regulated by remote thermostatic control. This thermostatic control may be placed outside of the building to be heated so that the adjustments will be made according to weather or outside temperature changes, or the same may be placed in the building to be heated at a key or strategic position therein, and preferably both outside and inside thermostatic controls are used and are combined to cooperate together to control the adjustments.

By making and controlling the adjustments automatically when and as needed to meet both outside and inside varying temperature conditions, obviously great economy in fuel consumption can be obtained, as the steam supplied always will be proportioned to the amount needed to keep the space to be heated at an even predetermined temperature.

The invention is illustrated in the accompanying seven sheets of drawings, in which Figure 1 is a side elevation, partly in diagram, illustrating the use of my invention in a well known form of vacuum steam heating system;

Fig. 1ª is an enlarged sectional view of a detail hereinafter referred to;

Fig. 2 is a central sectional elevation of the parts shown in Fig. 1, on an enlarged scale illustrating a pressure regulator or reducing valve with my novel mechanism applied thereto;

Fig. 3 is a sectional elevation, taken on the line 3—3 of Fig. 2;

Fig. 4 is a plan, and Fig. 5 is a side elevation on an enlarged scale of an adjustable cam employed in the mechanism;

Fig. 6 is a sectional plan view, taken on the line 6—6 of Fig. 2;

Fig. 7 is a detail sectional view of a reducing gearing hereinafter referred to;

Fig. 8 is a sectional view, taken on the line 8—8 of Fig. 6;

Fig. 9 is a perspective view on an enlarged scale, illustrating the electric switches;

Fig. 10 is an elevation partly in section, and Fig. 11 is a rear elevation of an outside thermostatic mechanism which can be used;

Figs. 12 and 13 are similar views illustrating a modification;

Fig. 14 is a diagram of the electric wiring;

Figs. 15 and 16 are diagrams illustrating modifications of the wiring;

Fig. 17 is a diagram illustrating the wiring of an electric couple hereinafter described;

Fig. 18 is a side elevation, partly in section, illustrating a modification employing a spring mechanism;

Fig. 19 is a central cross sectional elevation on an enlarged scale showing the spring connection to the valve stem;

Fig. 20 is a section on an enlarged scale through the line 20—20 of Fig. 18;

Fig. 21 is an elevation of one of the cover plates;

Fig. 22 is a side view on an enlarged scale of the setting bar hereinafter described;

Fig. 23 is a sectional plan of a further modification;

Fig. 24 is a cross sectional view on the line 24—24 of Fig. 23;

Fig. 25 is an elevation on an enlarged scale of the spring tension adjusting mechanism;

Fig. 26 is a cross sectional view on the line 26—26 of Figure 25; and

Figs. 27, 28 and 29 show details hereinafter described.

Referring to the drawings, and in detail, A designates the boiler, B the steam supply pipe, C the radiators, D the return line, and E the pumping mechanism of a well-known form of vacuum steam heating system.

The pipes extending to the radiators may have calibrating orifices c incorporated therein, as illustrated in Fig. 1ª, if desired.

In the mechanism shown, air or gas is removed and evacuated from the system, and the water of condensation is returned to the boiler by the pumping mechanism. The pumping mechanism also acts to keep the system under partial vacuum so that steam may be generated and condensed in the radiators below or above atmospheric pressure as desired, as is well understood in the art.

F designates the pressure regulator or reducing valve arranged to automatically control the supply of steam passing from the boiler into the supply line. This valve (see Fig. 2), comprises a casing G having a double valve seat, with which a double or balancing valve H arranged on the stem I cooperates, the stem being connected to a diaphragm J exposed to the steam pressure beyond valve H on one side and to the atmosphere on the other, and a weight or weights forming the mechanical element for controlling the operation of the valve.

As thus far described, except in the arrangement of weights hereinafter detailed, the parts referred to make up an approved form of vacuum steam heating system, in which a pressure regulator or reducing valve is employed, and in which a given setting of the weight or weights will maintain a constant determined pressure on the discharge side of the valve, that is, on the inlet side of the system.

I provide this valve with my automatic control mechanism actuated by an outside thermostatic control and modified by inside thermostatic control to adjust automatically this determined pressure in proportion to the outside temperature and to the requirements of the building.

This mechanism is constructed and arranged as follows:—

A bracket 10 is secured to the bottom of the casing in which the diaphragm is arranged and the same is provided with ball bearings 11—11, in which are journalled hubs or pintles 12—12 projecting from a block 13, having a rectangular recess extending longitudinally through the same. Four rollers 14 are journalled on pins in recesses near the ends of the block, and a weight bar 15 is arranged to slide back and forth through said block 13 on said rollers 14.

A weight 16 is secured to one end of the bar 15, and preferably a smaller weight 17 is secured to the other end of the bar, so that the center of gravity of the bar will be nearer the large weight. The parts 15, 16 and 17 make up or constitute the mechanical element or weight as these terms are used in the claims, although this element may be made in many forms.

The weight bar 15 extends through a yoke 18 secured to the end of the valve stem I and the yoke 18 is provided with rollers 19 bearing on the bar, so that the same can be shifted easily longitudinally therein.

A supplemental stem I' is secured to the yoke 18, and the stems I and I' are fitted to slide in brackets 20—20 secured to the bracket 10.

It is obvious from the foregoing description that if the weight bar and weights should be shifted to the right so that the center of gravity thereof will be at the right of the pintles, that the same will then act to assist the downward or steam pressure movement of the diaphragm J and the closing of the valve H; while if they should be shifted to the left to bring the center of gravity to the left of the pintles that the same would then help to open the valve. It also will be noted that the amount of shift either to the right or left determines the amount of pull or push exerted by the weights.

It thus follows, that when the weights are shifted to the left, the mechanism will be set to cause the valve to maintain a greater pressure in the supply line, and that when the weights are shifted to the right, the mechanism will be set to cause the valve to maintain a lesser pressure in the supply line, and that the pressures maintained will be directly proportioned to amount of the shift.

It also will be noted that by substantial adjustment to the right the steam pressures beyond the valve may be sub-atmospheric to utilize the advantages obtained in vacuum steam heating.

The following mechanism is provided to shift the weight.

A bracket 21 is secured to block 13 and mounted on the same is an electric motor 22, which through a worm reduction gearing 23, (Fig. 7) drives a screw 24, which is threaded into a nut 25 attached to the smaller weight 17. The motor is reversible, its stator circuits being shown at the right and left in the diagrams on Sheet 5. By proper control of these circuits the motor will move the weights either to the right or left, (Fig. 6) so that the action of the pressure regulator can be adjusted to cause a maximum, minimum or any intermediate pressure in the supply line.

The switches for controlling the operation of the motor 22 are arranged in a box 26, which is secured to the bracket 10, by bracket 27.

In the preferred arrangement, a double pole Mercoid switch 28 and two single Mercoid switches 29 and 30, are held by clamps 31 on a shaft 32 journalled in the sides of the box 26. The term "Mercoid switch" is employed to designate a switch comprising a vacuum tube having poles and being partly filled with mercury, so that by rocking the tube the switch may be opened or closed.

The Mercoid switch 28 has two sets of poles forming two switches M and M', the switch 29 a single set N, and the switch 30 a single set O.

An arm or lever 33 is secured on the shaft 32 and the end of the same is provided with a pin 34, fitting between collars 35—35 adjustably secured on a shaft 36 fitted to slide in bearings in the box 26.

A spring 37 is arranged on the shaft 36, to push the same normally to the left, see Fig. 9.

A yoke 38 is arranged on the end of the shaft 36, and pivoted thereto is a floating control rod 39. A slotted guide 40 is secured to the bracket 27, through which the control rod projects.

A follow-up bar 41 is arranged between weights 16 and 17 and the rod 39 is provided with a hub or bearing 42 engaging the same. The bar 41 is set at an angle relatively to the weight bar 15, as shown in Fig. 6, so that the travel of the weight bar will cause the follow-up bar 41 to move the control rod 39 to or fro on the yoke 38 as a point.

The rod 39 is provided with another hub or bearing 43, which bears against a cam 44 secured on the shaft of the receiving electric motor 45 hereinafter described.

The cam 44 is provided with a rib or flange 46, through which set screws 47 are threaded to engage an adjustable cam face 48 formed of a strip of flexible metal secured at its ends to the cam, as shown in Figs. 4 and 5. When the valve is installed, the cam is set theoretically to give the desired operation, and if this is not exactly obtained, the set screws 47 are manipulated to change the contour of the cam until perfect operation is obtained to meet the conditions of the particular installation. After this is obtained, the adjustable or setting cam can be removed, and a solid cam shaped to correspond with the adjustment obtained by the screws can be substituted.

The motor 45 is connected by proper wiring to a cooperating motor 49, which is set or adjusted by the outside thermostat as hereinafter described. This motor couple comprises two electric motors, similar to three phase induction motors but having shuttle wound rotors with definite poles, the windings of which are connected through slip rings to a single phase alternating current source of excitation. One motor is placed at the sending point and acts as a generator or transmitting motor, and the other is placed at the receiving point and acts as an indicator or receiving motor. The wiring of this couple is illustrated in Fig. 17.

Briefly the operation is such that any movement of the rotor of the generator will cause the rotor of the receiver to move in exact synchronism, whereby the rotors will always stand in exactly the same angular relationship. In the device illustrated, 49 is the transmitting motor and 45 is the receiving motor.

The thermostatic mechanism for turning the rotor of the transmitting motor is shown in Figs. 10 and 11.

A tube or tank 50 is placed outside of the building to be heated and the same is filled with a fluid very responsive to temperature changes. A pipe 51 extends to the point where the transmitting motor 49 is placed, which preferably is inside the building. The pipe 51 is connected to a casing 52 having a diaphragm 53, arranged on a stem 54. A segmental gear 55 in mesh with a pinion 56 on the rotor of the transmitting motor 49 is pulled by a spring 57 against a fixed bearing 58 and the stem 54, adjustments being provided so that accurate setting can be obtained.

By this thermostatically operated means and the electric couple, the cam 44 will always be set or moved to a position determined by outside temperature conditions.

A modification of the mechanism shown in Figs. 10 and 11 is shown in Figs. 12 and 13.

In this modification, a Bourdon tube 59 is used instead of a diaphragm, and a sliding rack 60 is used instead of a segmental gear.

In addition to the switches previously described, limit or cut-out switches L and L' are secured on the bracket 27 and are set in position to be engaged by stops 61—61 adjustably secured on the follow-up bar 41 to prevent the weights 16 and 17 being moved too far in either direction to derange the mechanism.

Two double throw thermostatic switches T and T' are placed at a suitable point or points in the building to be heated.

Suppose it is desired to heat the building to 70 degrees Fahrenheit, the switch T may be set to throw, if the temperature drops to 69 degrees, and the switch T' may be set to throw if the temperature rises to 71 degrees, so that a very even temperature can be maintained.

The electric wiring is shown in Fig. 14. A time clock and switch P may be arranged in one of the lead-in wires so that the automatic controlling mechanism for the pressure regulator will be cut out of operation during the night, or at any interval during the day.

The operation is as follows:—

The outside thermostatic apparatus turns the rotor of the transmitting motor 49 in accordance with changes in outside temperature, and this in order turns the rotor of receiving motor 45 and cam 44. As the cam turns, the top of the floating control rod 39 will be moved to the right or left (Fig. 8) and the rod will pivot on the hub 42 bearing on the follow-up bar 41. This through the connections described will rock the Mercoid switches. As the Mercoid 28 is rocked, one or the other of the switches M or M' is closed and the motor 22 is operated to shift the weights 16 and 17. As this shifting takes place, the follow-up bar 41, through the hub 42 will rock the floating control rod 39 on the hub 43 bearing on the cam 44 as a pivot, and thus will turn the Mercoid switches back to normal position shown in Fig. 14.

When more heat is needed by a drop in the outside temperature, current flows to the motor 22 through the lead in, and from the motor through L, T' and M, which will cause the motor to move the compound weight to the left, (Fig. 2) to set the pressure regulator to let more steam into the supply line.

When less heat is needed by a rise in the outside temperature, current flows to the motor 22 through the lead-in, and from the motor through L', T and M', which will cause the motor to move the compound weight to the right, (Fig. 2) to set the pressure regulator to let less steam into the supply line.

It will be seen that this setting and follow-up action will exactly follow the setting caused by the outside thermostat, so that the compound weight will be shifted in either direction just the exact or proper distance to set the pressure regulator to operate in accordance with outside temperature changes. This is what I call the basic setting of the weight.

Now suppose the space to be heated becomes too cool or below 70°, under the figures previously assumed, the thermostatic switch T will throw or swing to the left from the position shown in Fig. 14, and current will flow through L, T and N, so that the motor 22 will operate to move the compound weight to the left to set the pressure regulator to supply more steam. This setting movement will continue until the Mercoid 29 is moved to nearly a horizontal position to open the switch N.

When the space to be heated is brought up to the desired temperature of 70°, the switch T will snap back to the position shown in Fig. 14 and as the switch M' will be closed by the adjustment just made, the parts will return to original position.

It is immaterial that M' is closed by the adjustment described, because switch T is at the left and no current can flow through M' until T returns to the position shown.

Now suppose the space to be heated becomes too hot or above 70° under the figures previously assumed, the thermostatic switch T' will throw or swing to the right from the position shown in Fig. 14, and current will flow through L', T' and O so that the motor 22 will operate to move the weights to the right to set the pressure regulator to supply less steam. This setting movement will continue until the Mercoid 30 is moved to nearly a horizontal position to open the switch O.

When the space to be heated is cooled down to the desired temperature of 70°, the switch T' will snap back to the position shown in Fig. 14 and as the switch M was closed by the adjustment just made, the parts will return to original position.

It is immaterial that M is closed by the adjustment described because the switch T' is at the right and no current can flow through M until T' returns to the position shown.

The amounts or ranges of the setting movements obtained by the operation of thermostatic switches T and T' are determined by the adjustment of the parts.

It will be seen that these adjustments obtained by temperature changes in the space to be heated are superimposed on the basic adjustments obtained by outside temperature changes, or in other words it will be seen that the basic operation sets the valve for proper operation to meet any outside temperature or weather condition, and that the inside apparatus works on this setting as a base and makes the proper determined supplemental adjustments necessary to maintain an even temperature in the building.

In the modification shown in Fig. 15, only one single Mercoid 30 and only one inside thermostatic switch T' is used. With this modification the parts are adjusted so that the basic setting obtained from the outside thermostat will be somewhat more than necessary, and so that the inside thermostat T' will correct or lower the basic setting a limited amount to maintain the desired temperature. Similarly the Mercoid 29 and switch T' could be omitted from the plan shown in Fig. 14, and the parts adjusted so that the basic setting obtained from the outside thermostat will be somewhat less than necessary, and so that the inside thermostat T will correct or raise the basic setting a limited amount to maintain the desired temperature.

In the modification shown in Fig. 16, only the Mercoid 28 is used and two inside thermostatic switches T² and T³ are employed, each having a double Mercoid arranged and wired as shown. In this modification, the outside thermostat is set to obtain as near as possible the proper setting of the valve for outside temperature conditions and the inside thermostats and Mercoids will adjust the settings to give more or less steam to meet requirements. The inside Mercoids being mounted on the thermostats T³ and T⁴ are not affected by the rocking movement of the parts carrying Mercoid 28, and will act to give a full range adjustment or practically a full opening or closing of the valve.

This arrangement can be employed to advantage in some systems but for most systems the arrangement shown in Fig. 14 or Fig. 15 is preferred.

In the sixth sheet of drawings, a modification is illustrated, in which a spring mechanism is employed as the adjustable mechanical element of the pressure regulator.

In this modification, the valve stem I and supplemental stem I' of the regulator are connected to a slotted cylinder or shell 62, in which are arranged two heavy centering springs 63—63.

A setting bar 64 is employed instead of the bar 15 of the previously described device and the same is moved back and forth by motor 22, screw 24 and nut 25. This bar is fitted to slide in cylinder 62 and the springs 63—63 are provided with thrust pieces 65—65 at their ends to bear on the top and bottom of the bar 64.

The springs 63—63 tend normally to bring the cylinder 62 substantially to a central position on the bar 64. The bar 64 is provided with inclined slots 66—66 on its sides.

The bracket 10ª employed in this modification is cored or hollowed out, as shown in Fig. 20, so the bar 64 can pass or extend through the same. Cover plates 67—67 are secured to the sides of the bracket 10ª, and each is provided with two rollers 68—68, which engage the inclined slots 66—66 in the bar 64.

The bar 64 is connected at its ends to cross members 69—69, to which the follow-up bar 41 is also connected.

By this arrangement, when the bar 64 is moved to the left, it will be moved upwardly so that the cylinder 62 and springs 63—63 will be moved upwardly, whereby it will take more downward pressure on the diaphragm J to close the valve H and hence the pressure regulator will be adjusted to supply more steam.

When the bar 64 is moved to the right, it also will be moved downwardly, so that the cylinder 62 and spring 63—63 will be moved downwardly, whereby it will take less downward pressure on the diaphragm J to close the valve H and hence the pressure regulator will be adjusted to supply less steam.

Thus the spring mechanism performs the same functions as the weight mechanism of the device previously described and the apparatus shown in the sixth sheet of drawings works in the same manner as the previously described apparatus.

A further modification employing a spring is illustrated in the seventh sheet of drawings.

In this modification, a bracket 70 is attached to the valve casing G, and fitted to slide horizontally therein are two bars 71—71, which are connected together at their ends by cross pieces 72—72 as shown in Figs. 28 and 29. The bars are moved back and forth by motor 22, gearing 23, screw 24 and nut 25 connected and operating as previously described. The follow up bar 41 is connected to the cross pieces 72—72. A supplemental bracket 73 is connected to the bracket 70 and carries the receiving motor 45, cam 44, control rod 39 and switch box 26 arranged and operating as previously described.

A rod or stem 74 is secured to valve stem I and the same is kept from turning by a pin or key 75 fitting in a slot therein.

A spring 76 is fitted on the rod 74. The upper end of spring 76 is secured to a collar 77 pinned to the rod 74 and the lower end of the spring 76 is pinned to a collar 77ª formed on top of adjusting screw 78, through which the rod 74 passes, the attachment being made by bushing 79 on which the end of the spring is threaded. This attachment is employed so as to leave the rod 74 free to move up and down through screw 78.

A bracket 80 is connected to bracket 70 and fitting between arms thereof is a worm wheel 81, which has a threaded hole forming a nut engaging screw 78.

The screw 78 is provided with a slot 82 engaging which are screws 83—83 tapped in the arms of bracket 80. By revolving worm wheel 81, the screw 78 will be raised or lowered to compress or expand spring 76.

Engaging the worm wheel 81 is a worm 84 arranged on shaft 85, which is driven by a sprocket chain and gears 86 from screw 24 operated by motor 22.

By this mechanism, the spring 76 will be automatically adjusted when and as needed to automatically adjust the operation of the automatically operating pressure regulator.

It will be noticed that the spring 76 can be adjusted to operate either as a tension or as a compression spring to assist or oppose the movement of the diaphragm J tending to close valve H. Thus the pressure regulator can be adjusted to supply steam above or below atmospheric pressure and in general this modification works in the same manner as the previously described devices.

The details and arrangements herein shown and described may be greatly varied by a skilled mechanic without departing from the scope of my invention as expressed in the claims.

Having thus fully described my invention, what I claim and desire to secure by Letters Patent is:—

1. An automatically operating pressure regulator provided with means for automatically and variably adjusting the setting of the mechanical element thereof to meet varying temperature conditions, and jointly operating outside and inside thermostatic control for said means.

2. An automatically operating pressure regulator provided with means for automatically adjusting the setting of the mechanical element thereof to meet varying temperature conditions, and outside thermostatic control for causing said means to operate to make basic adjustments, and inside thermostatic control for causing said means to operate to make supplemental adjustments superimposed on the basic adjustments.

3. A pressure regulator for automatically maintaining a fixed pressure, an adjustable weight for determining this pressure, means for automatically and variably adjusting the weight, and jointly operating outside and inside thermostatic control for said means.

4. A pressure regulator for automatically maintaining a fixed pressure, an adjustable weight for determining this pressure, and means for automatically making basic and supplemental adjustments of the weight.

5. A pressure regulator for automatically maintaining a fixed pressure, an adjustable weight for determining this pressure, and means for automatically making basic adjustments of said weight and for independently making supplemental adjustments of said weight.

6. A pressure regulator for automatically maintaining a fixed pressure, an adjustable weight for determining this pressure, and means for making basic adjustments of the weight controlled by outside temperature conditions and for making supplemental adjustments of the weight controlled by inside temperature conditions.

7. A pressure regulator for automatically maintaining a fixed pressure, an adjustable weight for determining this pressure, means for automatically adjusting the weight, an outside thermostat for causing said means to make basic adjustments, and an inside thermostat for causing said means to make supplemental adjustments of said weight.

8. A pressure regulator for automatically maintaining a fixed pressure, an adjustable element for determining this pressure, an electric motor for variably adjusting the element, switches, and jointly acting outside and inside thermostatic control for said switches.

9. The combination expressed in claim 8, the switches being rocking Mercoids.

10. A pressure regulator for automatically maintaining a fixed pressure, an adjustable element for determining this pressure, an electric motor for adjusting the element, a switch for throwing the motor into and out of operation, thermostatically controlled mechanism for closing said switch, and a follow-up mechanism for opening said switch.

11. A pressure regulator for automatically maintaining a fixed pressure, an adjustable element for determining this pressure, an electric motor for adjusting the element, a switch for throwing the motor into and out of operation, an outside thermostatically controlled mechanism for closing said switch, and a follow-up mechanism for opening said switch.

12. A pressure regulator for automatically maintaining a fixed pressure, an adjustable element for determining this pressure, an electric motor for adjusting the element, a switch for throwing the motor into and out of operation, thermostatically controlled mechanism for closing said switch, a follow-up mechanism for opening said switch, and inside thermostatically controlled switches for said motor.

13. A pressure regulator for automatically maintaining a fixed pressure, an adjustable element for determining this pressure, an electric motor for adjusting the element, switches for throwing the motor into and out of operation, thermostatically controlled mechanism for said switches, and a follow-up mechanism for controlling the operation of said switches arranged so that the adjustments will correspond to temperature changes.

14. A pressure regulator for automatically maintaining a fixed pressure, an adjustable element for determining this pressure, an electric motor for adjusting the element, switches for throwing the motor into and out of operation, outside and inside thermostatically controlled mechanism for said switches, and a follow-up mechanism for controlling the operation of said switches arranged so that the adjustments will correspond to temperature changes.

15. A pressure regulator for automatically maintaining a fixed pressure, an adjustable mechanical element for determining this pressure, mechanism for adjusting this element, and a thermostatically operated self-synchronous motor couple for controlling the operation of this mechanism.

16. A pressure regulator for automatically maintaining a fixed pressure, an adjustable mechanical element for determining this pressure, mechanism for adjusting this element, a thermostatically operated self-synchronous motor couple, and a follow-up mechanism for controlling the operation of this mechanism.

17. A pressure regulator for automatically maintaining a fixed pressure, an adjustable weight for determining this pressure, an electric motor for adjusting the weight, a switch for the motor, and a thermostatically operated self-synchronous motor couple and follow-up mechanism for closing and opening the switch.

18. A pressure regulator for automatically maintaining a fixed pressure, an adjustable weight for determining this pressure, an electric motor for adjusting the weight, a switch for the motor, and an outside thermostatically operated self-synchronous motor couple and follow-up mechanism for closing and opening the switch.

19. A pressure regulator for automatically maintaining a fixed pressure, an adjustable weight for determining this pressure, an electric motor for adjusting the weight, switches for controlling the motor, a thermostatically operated self-synchronous transmitter and receiving motor, a cam operated by the receiving motor, a floating control bar connected to the switches, and a follow-up bar, the control bar bearing both on the cam and follow-up bar.

20. A pressure regulator, a block pivoted thereto, a weighted bar fitted to slide in said block and connected to the valve stem of the regulator, and automatically operating mechanism for shifting said bar.

21. A pressure regulator, a block pivoted thereto, a weighted bar fitted to slide in said block and connected to the valve stem of the regulator, and an electric motor for shifting said bar.

22. A pressure regulator, a block pivoted thereto, a weighted bar fitted to slide in said block and connected to the valve stem of the regulator, and an electric motor carried by said block for shifting said bar.

23. A pressure regulator, a block pivoted thereto, a weighted bar fitted to slide in said block and connected to the valve stem of the regulator, an electric motor, and a screw geared thereto for shifting said bar.

24. A pressure regulator, a block pivoted thereto, a yoke connected to the valve stem of the regulator, a weighted bar fitted to slide in said block and said yoke, and automatically operating mechanism for shifting said bar.

25. A pressure regulator, a block pivoted thereto, a yoke connected to the valve stem of the regulator, a weighted bar fitted to slide in said block and said yoke, and an electric motor for shifting said bar.

26. A pressure regulator, an adjustable weight for determining the pressure, an electric motor for adjusting the weight, switches for throwing the motor into and out of operation and switches for limiting the extreme movements of the weight.

27. A pressure regulator, an adjustable weight for determining the pressure, an electric motor for adjusting the weight, a rocking double pole and two single pole Mercoid switches for throwing the motor into and out of operation, a floating control rod for rocking said switches, a thermostatically set cam, and a follow-up bar for actuating said control rod.

28. A pressure regulator, an adjustable weight for determining the pressure, an electric motor for adjusting the weight, a rocking double pole and two single pole Mercoid switches for throwing the motor into and out of operation, a floating control rod for rocking said switches, a cam, a thermostatically operated self-synchronous motor couple for adjusting the cam, and a follow-up bar, the rod being operated both by the cam and follow-up bar.

29. A pressure regulator, an adjustable weight for determining the pressure, an electric motor for adjusting the weight, a rocking double pole and two single pole Mercoid switches for throwing the motor into and out of operation, a floating control rod for rocking said switches, a cam, a thermostatically operated self-synchronous motor couple for adjusting the cam, a follow-up bar, the rod being operated both by the cam and follow-up bar, and inside thermostatic control for additionally throwing said motor into and out of operation.

30. A pressure regulator for automatically maintaining a fixed pressure, two opposed centering springs for determining this pressure, and means for automatically adjusting the springs to meet varying temperature conditions.

31. A pressure regulator for automatically maintaining a fixed pressure, a slotted shell connected to the valve stem thereof, two centering springs in said shell, a setting bar passing through the cylinder between the springs and means for adjusting the bar.

32. An automatically operating pressure regulator provided with means for automatically adjusting the setting of the mechanical element thereof to meet varying temperature conditions, a thermostatic control for causing said means to operate to make basic adjustments, and a second independently operating thermostatic control for causing said means to operate to make supplemental adjustments superimposed on the basic adjustments.

33. An automatically operating pressure regulator provided with means for automatically adjusting the setting of the mechanical element thereof to meet varying temperature conditions, an outside thermostatic control and an inside thermostatic control, one control being connected to cause said means to operate to make basic adjustments and the other thermostatic control being connected to cause said means to operate to make supplemental adjustments superimposed on the basic adjustments.

IRVING C. JENNINGS.